United States Patent [19]

Moses

[11] Patent Number: 4,877,530
[45] Date of Patent: * Oct. 31, 1989

[54] LIQUID $CO_2$/COSOLVENT EXTRACTION

[75] Inventor: John M. Moses, Dedham, Mass.

[73] Assignee: CF Systems Corporation, Waltham, Mass.

[*] Notice: The portion of the term of this patent subsequent to Sep. 13, 2005 has been disclaimed.

[21] Appl. No.: 161,999

[22] Filed: Feb. 29, 1988

Related U.S. Application Data

[62] Division of Ser. No. 603,563, Apr. 25, 1984, Pat. No. 4,770,780.

[51] Int. Cl.$^4$ ............................................. B01D 11/04
[52] U.S. Cl. .................................... 210/511; 210/634; 203/43
[58] Field of Search .................. 210/634, 511; 203/43, 203/49; 435/161; 208/337, 34

[56] References Cited

U.S. PATENT DOCUMENTS

| | | | |
|---|---|---|---|
| 2,631,966 | 3/1953 | Francis | 208/321 |
| 3,969,196 | 7/1976 | Zosel | 208/337 X |
| 4,306,884 | 12/1981 | Roth | 203/43 X |
| 4,770,780 | 9/1988 | Moses | 210/634 |

Primary Examiner—Frank Spear
Attorney, Agent, or Firm—Schiller, Pandiscio & Kusmer

[57] ABSTRACT

Disclosed are a fluid extractant, and a process and apparatus for using the extractant to separate an organic liquid from an aqueous mixture. The extractant comprises a first fluid solvent which is a gas in its near-critical or supercritical state and a cosolvent. A preferred first fluid solvent is near-critical liquid carbon dioxide. Preferred cosolvents are 2-ethyl hexanol for ethanol extraction, and hexanoic acid for acetic acid extraction. Organic compounds such as monohydric alcohols, monoacids, ketones, ethers, aldehydes and esters can be recovered from dilute aqueous solutions more economically than possible by prior art processes of distillation.

5 Claims, 5 Drawing Sheets

APPROXIMATE $CO_2$ STATE CONDITIONS

A - IN EXTRACTION COLUMN
B - FEED TO STILL
C - OVERHEAD FROM STILL
D - COMPRESSOR DISCHARGE

LIQUID CO₂/COSOLVENT EXTRACTION

This application is a divisional application of our copending application Ser. No. 603,563, filed Apr. 25, 1984, now U.S. Pat. No. 4,770,780.

This invention relates to a process and apparatus for solvent extraction and more particularly to a process and apparatus for extracting large volumes of liquid organics from their aqueous solutions.

In a number of commercial processes used for manufacturing many of the high-volume, liquid organic compounds (such as oxygenated hydrocarbons, organic sulfur compounds, organic nitrogen compounds, halogenated hydrocarbons, organo-metallic compounds, and the like) it is necessary to separate the organic compounds from aqueous solutions In many of these mixtures, water constitutes a major portion of the solution. The separation of these organic compounds from water may require relatively large and complex distillation equipment and demands a heavy expenditure of energy, if only to boil off the water. In a large number of these cases the water and organic liquids form azeotropes, often necessitating higher energy costs to even partially break the azeotrope.

At present, about 3% of the total national energy consumption in the United States is used for distillation in petroleum refining and chemical processing. It is therefore clear that a process and/or apparatus which materially decreases the energy requirements for separating even a portion of such solutes from their solutions, would provide a highly desirable savings in energy.

It is therefore a primary object of this invention to provide an improved fluid extractant for extracting an organic solute from its aqueous solution. A further object is to provide a fluid extractant of the character described which minimizes the amount of fluid extractant which must be cycled, and reduces capital equipment and operating costs. Yet another object is to provide such a fluid extractant which is particularly suitable for separating from very dilute aqueous solutions, chemicals such as lower alcohols and acids which are not readily extracted with a single solvent.

Another primary object of this invention is to provide an improved process for extracting liquid organic compounds and the like from admixtures with water. An additional object is to provide such a process which makes it possible to employ distillation equipment having fewer stages in smaller and less complex distillation equipment than now used. Yet a further object is provide a process for extracting such organic solutes from their solvents using liquid carbon dioxide (i.e. near critical or super critical) as an extractant component, thereby taking advantage of many of the unique properties of this particular extractant including favorable diffusion coefficients, low viscosity and low heat of vaporizaton. A still further object of this invention is to provide such a process which uses as one component of a fluid extractant, a non-polluting, nontoxic and relatively inexpensive fluid, i.e. carbon dioxide.

Yet another primary object of this invention is to provide improved apparatus for extracting organic liquid solutes from their solutions, the improvement lying in a combination of apparatus components. An additional object is to provide apparatus of the character described which makes possible the use of a fluid solvent with resulting savings in energy requirements and capital equipment costs.

According to one aspect of this invention there is provided a fluid extractant for extracting an oxygenated hydrocarbon solute from an aqueous solution, the extractant comprising a mixture of liquid carbon dioxide and a cosolvent. The latter preferably has inter alia, the following attributes: it is a liquid at the temperature and pressure of the extraction process, is substantially a better solvent for the hydrocarbon solute than for water under the extraction conditions; has a boiling point substantially different than that of the solute, is soluble in the liquid carbon dioxide to form a single-phase liquid under extraction conditions, and is essentially chemically unreactive with either the aqueous solution or the carbon dioxide at process conditions.

According to another aspect of this invention, there is provided a process for separating an organic liquid solute from an aqueous liquid mixture characterized by the steps of contacting at an elevated pressure the liquid mixture with a fluid extractant comprising a first solvent fluid and a cosolvent of the type described, thereby to form two phases, the first phase comprising an extract of the solute in the fluid extractant and the second phase comprising water with residual cosolvent, solute and first solvent; contacting the second phase with additional first solvent fluid to remove the residual cosolvent therefrom and transfer it to said first phase; and separating the first and second phases. The first solvent fluid is a gas under ambient conditions of temperature and pressure which is used in its liquid near-critical or supercritical state. A preferable first solvent fluid is liquid carbon dioxide e.g. carbon dioxide below its critical temperature and at a pressure sufficiently high to maintain it as a liquid solvent.

According to yet another aspect of this invention, there is provided an apparatus for separating an organic liquid solute from an organic liquid solute/water combination, the apparatus comprising pressure vessel means for effecting countercurrent contact between (1) the combination of an organic liquid solute and water, and (2) a pressurized extractant comprising a mixture of a pressurized first fluid and a cosolvent of the type described. Because the latter mixture is a solvent for the organic liquid solute but substantially less for water, the apparatus produces a fluid extract of the organic liquid in the extractant fluid and a raffinate comprising water with minor amounts of the first solvent and organic liquid solute. The apparatus also comprises mixer means for mixing the first fluid and the liquid cosolvent to form the extractant fluid; means for introducing the extractant fluid into the pressure vessel means at a predetermined level; means for introducing additional first fluid below the predetermined level; first distillation vessel for separating a still feed into an overhead vapor and first liquid bottoms and having associated therewith reboiler means including heat exchange means for circulating a heat transfer fluid therethrough in indirect heat exchange relationship with the first liquid bottoms; first pressure line means connected for conveying the fluid extract as a still feed from the pressure vessel means to the first distillation vessel means; vapor compressor means; second pressure line means incorporating the vapor compressor means and connected for conveying the overhead vapor to the vapor compressor means and recompressed vapor therefrom through the heat exchange means; third pressure line means for recycling the condensed vapor or supercritical fluid from the heat exchange means to the mixer means and to the means for introducing pressurized first fluid below the predetermined level; still bottom pressure reducing means; flash tank means; fourth pressure line means incorporating the still bottom pressure reducing means and connected for conveying the still bottoms from the reboiler means to the flash tank means through the still bottom pressure reducing means to provide a mixture of the liquid solute and cosolvent; second distillation vessel means connected for separating the liquid solute into product and the cosolvent by distillation; liquid line means incorporating heating means connected for conveying the mixture of the liquid solute and the cosolvent from the flash tank means to the second distillation vessel means; and means for returning the cosolvent from the second distillation vessel means to the mixer means. In a preferred embodiment of the apparatus, vapor recompression means are used in connection with the first distillation vessel to provide the heat required to heat the still bottoms therein.

Other objects of the invention will in part be obvious and will in part be apparent hereinafter.

The invention accordingly comprises the apparatus possessing the construction, combination of elements and arrangement of parts, the process involving the several steps and relation of one or more of such steps with respect to each of the others, and the composition of matter having the particular characteristics, all of which are exemplified in the following detailed disclosure and the scope of the application of which will be indicated in the claims.

For a fuller understanding of the nature and objects of the invention, reference should be had to the following detailed description taken in connection with the accompanying drawings in which.

Figure 1:
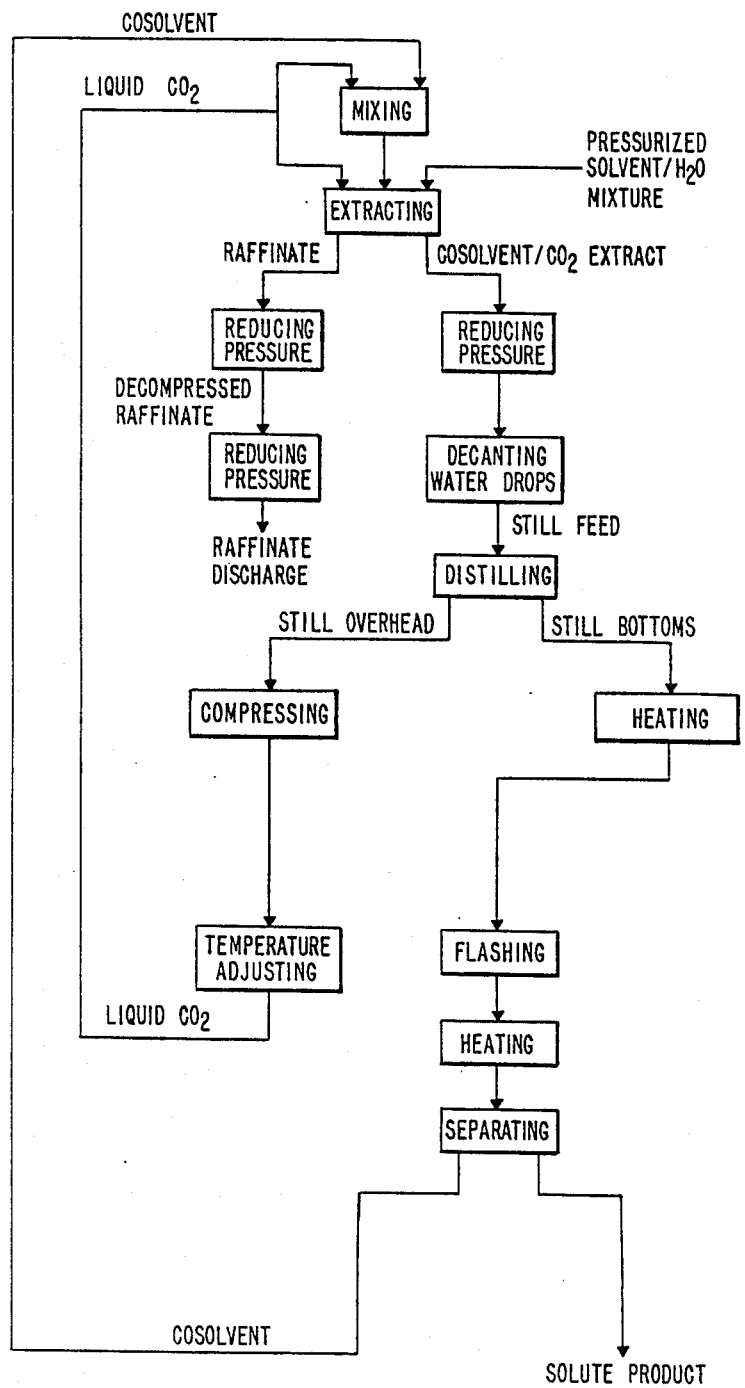
FIG. 1 is a flow chart of the process of the present invention using liquid carbon dioxide with a cosolvent as the extractant fluid.

In the prior art, the removal of highly polar organic compounds, such as the lower alcohols, acids, ethers, aldehydes, ketones, ester and the like, from aqueous streams is often accomplished by steam stripping and fractional distillation. This prior art process requires costly capital equipment and is highly energy intensive. In some cases liquid-liquid solvent extraction may be used for concentrating some feeds For example, the $C_4$ to $C_{10}$ esters, ethers and ketones can be used as solvents to extract acetic acid from water; but these solvents have poor selectivities and low equilibrium distribution coefficients, resulting in large solvent circulation rates, excessive equipment size and high energy costs. Moreover, such conventional liquid solvents have high mutual solubilities with water, thus requiring further drying to remove substantial amounts of water.

Recently new processes have been described for recovering acetic acid from feed streams below five weight percent acetic acid. (See for example Ricker, N. L., Pittman, E. F., and King, C. J., "Solvent Properties of Organic Bases for Extraction of Acetic Acid From Dilute Aqueous Industrial Streams," J. Separ. Proc. Technol., 1 (2) 23–30 (1980).) These processes involve using organic Lewis bases such as alkylamines and phosphine oxides as cosolvent extractants to increase the distribution coefficients. Such processes, however, still require the distillation separation of solvent systems with high-boiling points.

It has been known for some time that many compounds which are gases at ambient temperature and pressure can be converted to supercritical fluids by subjecting them to conditions such that they are at or above their critical pressures and temperatures. At pressures and/or temperatures somewhat below the critical points, most of these gases may be liquefied to attain what is termed their near-critical state. These gases in either their near-critical liquid or supercritical fluid state become good solvents for many organic materials. It is therefore possible to refer to them as being in a solvent condition, the actual temperature and pressure for any one fluid in its solvent condition being readily determinable for the solute to be separated and recovered.

Among those gases which may be converted to the solvent-condition fluid state are alkane and alkene hydrocarbons such as ethane, propane, butane, ethylene, and propylene; halogenated hydrocarbons such as the halomethanes and haloethanes; and inorganics such as carbon dioxide, ammonia, sulfur dioxide and nitrous oxide. Suitable mixtures of these gases may also be used.

Of these gases which may be in the solvent condition, carbon dioxide, ethylene and ethane may be used as illustrative of the temperatures and pressures required. These gases are of particular interest because they fall within the near-critical and supercritical regimes at essentially ambient temperature and have critical pressures in the range of 50 to 75 atmospheres—pressures which are readily handled by existing equipment components. The critical temperature and pressure for each of these gases are well known and, as noted, the solvent condition temperature and pressure ranges can readily be determined. For example, carbon dioxide has a critical temperature of 31.1° C. and its solvent condition temperature may range between about −40° C. and about 150° C. The critical pressure of carbon dioxide is 72.8 atmospheres and its solvent condition pressure may range between about 30 and 150 atmospheres, or higher.

Carbon dioxide in its solvent condition is a preferred first solvent in admixture with a cosolvent in the practice of this invention, for it possesses a unique combination of properties. In addition to its good solvent properties under the conditions used, liquid carbon dioxide in its near-critical sate has distinctly favorable diffusion coefficients compared to normal liquids, a property which gives rise to high mass-transfer coefficients. This in turn offers the possibility of minimizing or even effectively eliminating significant transport resistance in the carbon dioxide phase resulting in an increase in the overall extraction rate. It also thereby offers the possibility of decreasing the size and more effectively optimizing the design of the contacting columns used.

A second favorable property of solvent-condition carbon dioxide is its low viscosity which is about a factor of ten less than that of conventional liquid solvents. Since viscosity enters into the flooding characteristics of an extraction column, high flooding velocities and thus higher flow capacities can be achieved with a concomitant reduction in contacting column diameter and capital expenditure costs.

The high volatility of carbon dioxide relative to many of the organic liquids produced and used in high volume (e.g. ethanol, acetic acid, methyl ethyl ketone, and the like) and which are generally extracted from a water mixture, permits a distillation column in the present invention to operate as an evaporator with a short stripping section using fewer stages. The heat of vaporization of the solvent-condition liquid carbon dioxide is very low, being about one-fifth of that of many normal liquid solvents and about one-thirteenth that of water. A low mutual solubility of carbon dioxide in water keeps losses in the raffinate low and therefore can obviate the need for a raffinate-stripping column.

Finally, carbon dioxide is inexpensive, non-polluting and nontoxic, requiring no special equipment or procedures for storage and handling beyond normal practice for pressure systems.

The ability of carbon dioxide in its near-critical state and in its supercritical state to serve as an extracting solvent has been known for a number of years. (See for example Francis, A. W., J. Phys. Chem. 58, 1099 (1954) and Ind. Eng. Chem. 47, 230 (1955).) Near-critical and supercritical fluids, including carbon dioxide, have been suggested as solvents for a wide range of materials including various oils (U.S. Pat. Nos. 1,805,751, 2,130,147, 2,281,865); flavor components (U.S. Pat. No. 3,477,856); caffein in coffee (U.S. Pat. No. 3,843,832); cocoa butter from a cocoa mass (U.S. Pat. No. 3,923,847); fats from grains and the like (U.S. Pat. No. 3,939,281); residual hexane from de-fatted grain (U.S. Pat. No. 3,966,981); and a variety of materials such as paraffins, glycerol, oils and fats from a variety of compositions (U.S. Pat. No. 3,969,196). A very detailed review of the general field of extraction with supercritical gases is to be found in Angewandte Chemie—International Edition in English, 17: 10, pp 701–784 (October 1978). Of particular interest is the flow sheet of a pilot plant for continuous "destraction" of petroleum top-residues with propane appearing as FIG. 5 on page 707 of the Angewandte Chemie reference.

It must be recognized that the removal of a polar organic solute from an aqueous solution by solvation is a complex and unpredictable phenomenon. For example, it has long been believed that when using a nonpolar solvent to remove a polar organic solute from water (i.e. the system, solvent/water/solute) the addition of a cosolvent, more polar than the original solvent, (i.e. providing the system solvent/cosolvent/water/solute) should improve the solubility of the solute in the solvent mixture. As will be seen later herein, this general rule does not apply where liquid $CO_2$ is used as the solvent to remove the organic solute from aqueous solution.

In U.S. Pat. Nos. 4,375,387 and 4,349,415, there are described systems for extracting organic liquids from their aqueous solution by contacting the solution with an extractant fluid under conditions of temperature and pressure to render the extractant fluid a solvent for the organic liquid solute but substantially less for the solvent, thereby forming a fluid extract of the organic liquid solute in the extractant fluid and a raffinate comprising the solvent with minor amounts of the extractant fluid and organic liquid solute. The extractant fluid is further characterized as being a gas at ordinary ambient conditions of temperature and pressure. The fluid extract of the solute is used to provide a still feed for a further distillation step. The energy required to effect distillation is provided by compression of the overhead still vapors to heat the latter and indirectly heat the still feed. A preferred extractant used in this system is solvent-condition carbon dioxide fluid at a pressure between about 30 and about 150 atmospheres and a temperature between about 0° and 150° C. The basic energy-saving principle of these patents is employed in the present invention for the mixed solvent process.

Although the use of such extractant fluids as carbon dioxide, propane, ethylene and ethane (maintained under the specified conditions of temperature and pressure) have been found to be effective in separating oxygenated hydrocarbons from their aqueous solutions, some of the liquid organic solutes such as ethyl alcohol, acetic acid and the like exhibit low distribution coefficients and hence require circulating very large quantities of the liquid extractant.

Supercritical carbon dioxide and propane, along with acetone as an entrainer, have been used to separate mono and diglycerides. The acetone entrainer increased the solubility of the glycerides, altered their relative volatilities and facilitated subsequent product-solvent separation. (See Peter, Siegfried and Brunner, Gerd, Angew. Chem. Int. Ed. Engl. 746: 46–50 (1978).) Cosolvents to enhance the solubility and selectivity of materials in the solvent phase of a supercritical carbon dioxide extraction have been proposed in the literature. Zosel (U.S. Pat. No. 3,806,619) discloses the use of water-saturated carbon dioxide to selectively extract caffein from coffee; and Wheldon et al (U.S. Pat. No. 4,278,012) mention the use of ethanol to improve hops extraction with carbon dioxide.

Shimshick in U.S. Pat. No. 4,250,331 discloses a process for recovering carboxylic acids from dilute aqueous solutions of alkali metal salts of the carboxylic acids by mixing the solutions with a supercritical solution containing carbon dioxide with or without a cosolvent. Shimshick claims that the carbon dioxide reacts with the salt to form the carboxylic acid which in turn dissolves in the supercritical fluid. While Shimshick (and Francis in U.S. Pat. No. 4,250,331) recognizes that the use of a cosolvent with fluid $CO_2$ may enhance the solvent separation process, Shimshick teaches that the added cosolvent must be a supercritical gas having a $T_c$ of less than 130° C., and should be more polar than $CO_2$ and thus have a net dipole moment. However, the only cosolvent gases disclosed by Shimshick are dimethyl ether and a number of halogenated hydrocarbons such as the Freons. Francis, on the other hand, discloses a large selection of liquid cosolvents, but is concerned only with extraction from a hydrocarbon mixture, not an aqueous solution.

In the separation of liquid-liquid systems such as aqueous solutions of ethanol, acetic acid, ketones, esters, ethers and the like, using a fluid extractant such as carbon dioxide, it is desirable to be able to maximize the distribution coefficient (D.C.) with respect to the solute, and the selectivity ( ) for the system. The distribution coefficient indicates the ratio of $CO_2$ to aqueous feed needed for a specified separation, and it is defined, for a particular solute as:

$$D.C. = \frac{\text{(wgt. fraction of solute in CO}_2\text{ phase)}}{\text{(CO}_2\text{-free, wgt. fraction of solute in H}_2\text{O phase)}}$$

The selectivity ($\beta$) is a measure of the solute-to-water ratio in the extractant fluid, and it is defined as:

$$\beta = \frac{\text{(weight ratio solute to water in CO}_2\text{ phase)}}{\text{(weight ratio solute to water in H}_2\text{O phase)}}$$

In the practice of the present invention, a cosolvent for the solute is added to a first solvent fluid (e.g. liquid carbon dioxide), to increase D.C. and $\beta$ so that the amount of extractant which must be cycled is less, and the size of apparatus components required are smaller than that required for the extractant alone.

Although supercritical carbon dioxide may be used as the extractant fluid, it is substantially as effective in the practice of this invention to use the carbon dioxide in its liquid state, and preferable to use it at approximately ambient temperature or lower and at pressures sufficiently near or above its critical pressure of 72.8 atmospheres to maintain the liquid in the desired solvent state. A preferred pressure range is between about 60 and 85 atmospheres. Typical combinations of extraction temperatures and pressures are illustrated in the following Examples For convenience of further description of the invention, this first or primary solvent fluid will hereinafter be referred to as liquid carbon dioxide. It is, however, to be understood that gases such as propane, ethane, ethylene and the like may be used.

The preferred cosolvent used with the liquid carbon dioxide to form the extractant fluid of this invention is characterized as follows: it is a liquid at about 60° C. and standard pressure; it is an oxygenated, monofunctionally substituted hydrocarbon (i.e. has one radical substituted thereon to impart hydrogen-bonding and polar components substantially lacking in such primary solvents as carbon dioxide); the cosolvent should have an affinity for and be a solvent for the organic liquid solute in normal liquid-liquid extraction systems, i.e. the cosolvent should be a substantially better solvent for the liquid solute than for the water where an aqueous solution is to be separated; the cosolvent should have a solubility in $CO_2$ greater than 1 weight percent so that under the conditions of extraction and separation, the carbon dioxide/cosolvent mixture forms a single phase; the cosolvent should have a distribution coefficient ($CO_2$/water) in the absence of solute, of greater than 3 on a weight basis; the cosolvent should have a boiling point substantially above or below that of the liquid solute at atmospheric pressure, to facilitate a final distillation separation of organic liquid solute from cosolvent. Finally, the cosolvent should be substantially chemically unreactive under process conditions with the first solvent fluid, the liquid solute and water.

Typically, for example, monofunctional alcohols having less than six carbon atoms in the molecule, exhibit distribution coefficients ($CO_2/H_2O$) of considerably less than 3 on a weight basis so are considered unsuitable as cosolvents in the present invention.

The cosolvent is used in an amount sufficient to effect an appreciable increase in the distribution coefficient over that achieved by carbon dioxide alone for a given selectivity ($\beta$) of the extraction system being used. Generally, the amount of cosolvent added to the extraction fluid will not be greater than about 30 weight percent or less than 1 weight percent of the first solvent fluid, e.g. carbon dioxide, used. Examples of suitable cosolvents are alcohols such as n-amyl alcohol, 2-ethyl hexanol, n-butanol, hexanol, ethyl hexanediol, t-amyl alcohol, dodecyl alcohol, decyl alcohol; acids such as hexanoic acid, octanoic acid, pentanoic acid, heptanoic acid; amines such as trioctylamine and isopropylamine; aldehydes such as furfural; phosphine oxides such as trioctylphosphine oxide; and mixtures thereof.

The mixture of first solvent fluid (e.g. liquid carbon dioxide) and cosolvent is used to extract the liquid solute from the water. Unless otherwise specified, the term "extractant fluid" is used hereinafter to designate the novel combination of fluids, of this invention, i.e., liquid carbon dioxide as representative of the first solvent fluid, and any of the above-identified cosolvents.

The use of cosolvents with liquid $CO_2$ has been described in Francis (U.S. Pat. No. 2,631,966) to fractionate mixtures of lubricating oils. The use of liquid $CO_2$ for extraction purposes is also described in U.S Pat. Nos. 2,034,495 and 2,346,639 (liquid $CO_2$ as cosolvent with $SO_2$ as primary solvent); U.S. Pat. Nos. 2,246,227 (acetone as cosolvent); 2,281,865 and 2,631,966 (other cosolvents).

The use of extractant fluids according to the process of this invention is applicable to the extraction of a wide range of organic liquid solutes from their aqueous solutions, as long as the water of the solution is relatively immiscible with the extractant fluid under the conditions of temperature and pressure employed. Such organic liquid solutes include water miscible oxygenated hydrocarbons including the aliphatic alcohols such as ethanol, isopropanol and the like; the polyhydric alcohols; as well as acids, aldehydes, esters and ketones, and the materials earlier listed herein.

Figure 2:
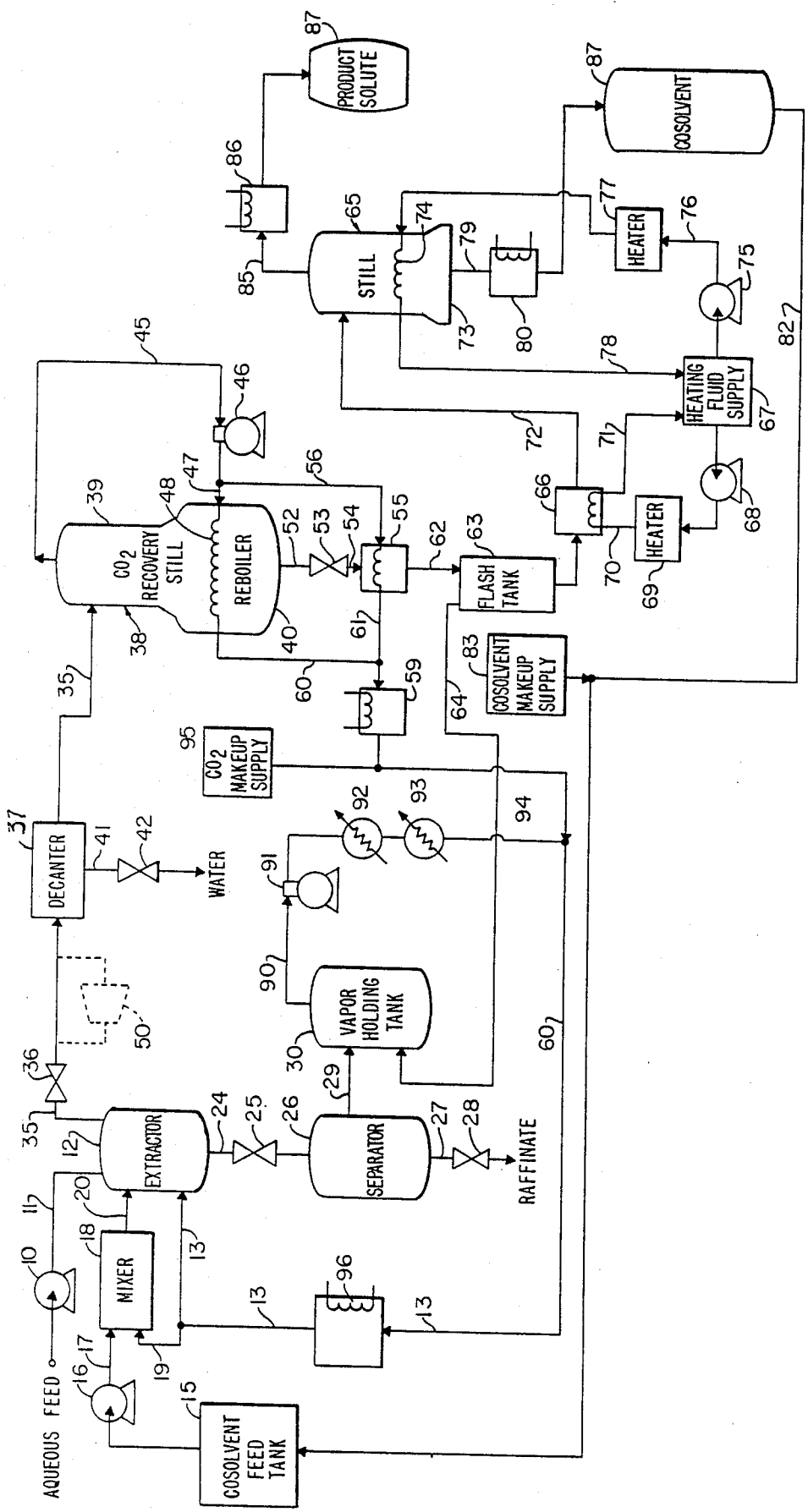
FIG. 2 is a block diagram of an exemplary apparatus incorporating the principles of the present invention.

The steps of the process of this invention are detailed in the flow chart of FIG. 1; and the basic apparatus is diagrammed in FIG. 2. Reference should be had to these drawings in the following detailed description.

Figure 4:
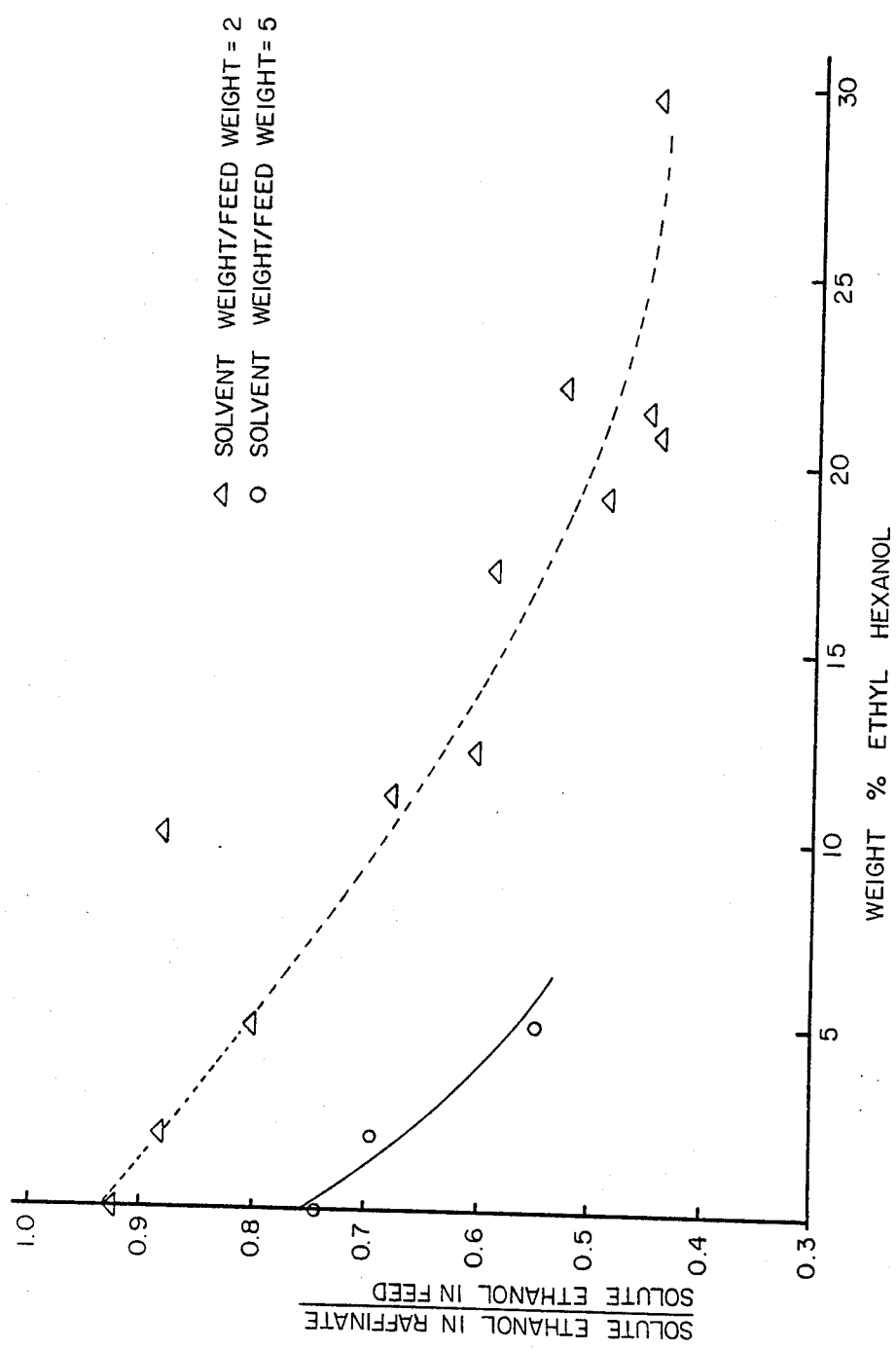
FIG. 4 is a plot showing the relation between the effectiveness of liquid solute (ethanol) removal from a water mixture and the amount of cosolvent used in the process of the present invention.
Figure 5:
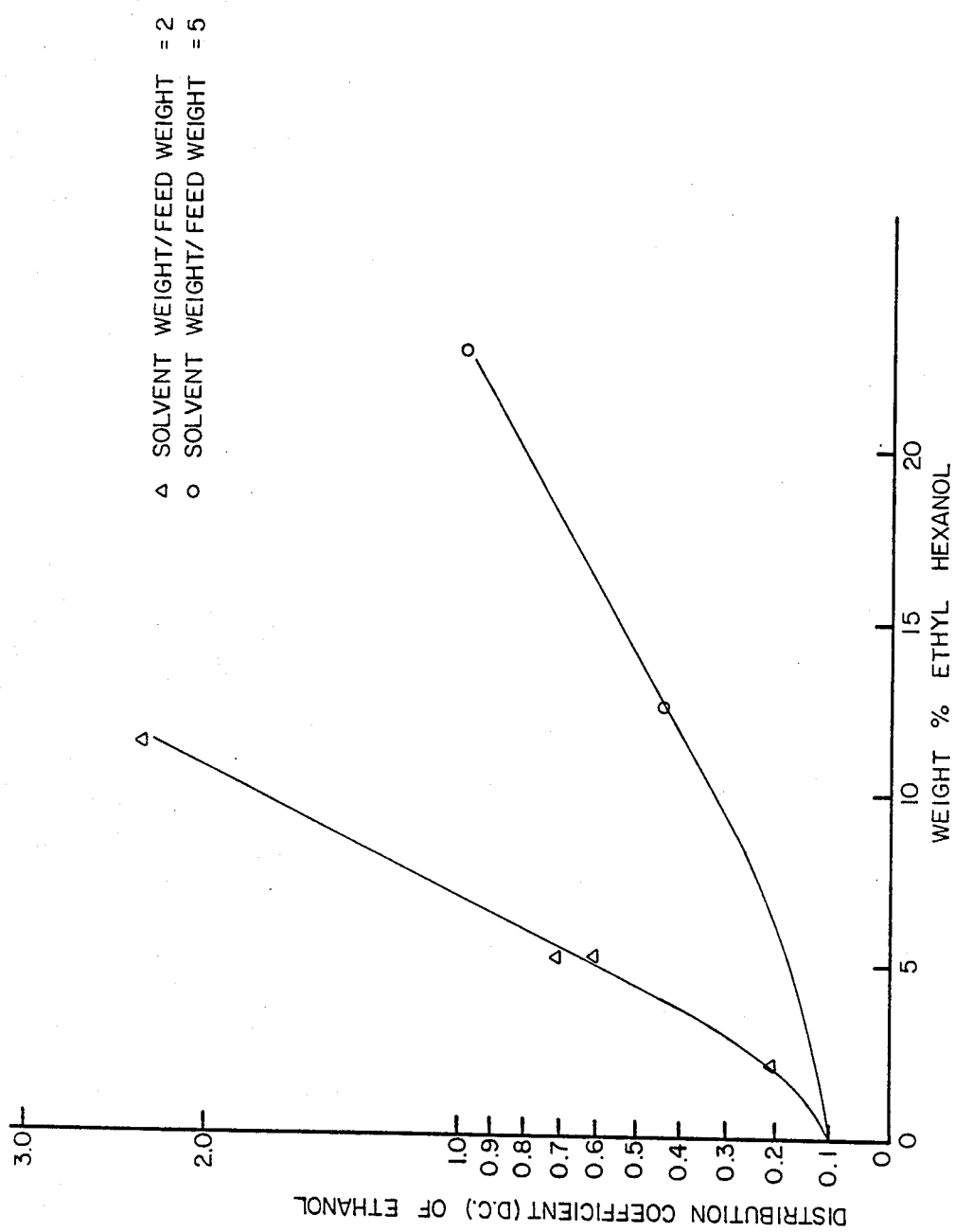
FIG. 5 is a plot showing the relation between the calculated distribution coefficient for a given selectivity value for an ethanol/water mixture and the amount of cosolvent used.

For purposes of illustration, an aqueous solution of ethanol will be considered as the feed; and liquid carbon dioxide as the primary solvent with 2-ethyl hexanol as a cosolvent will be considered as the extractant fluid. FIG. 4 illustrates how vapor recompression may be used in separating extract from the carbon dioxide; and FIGS. 5 and 6 illustrate the improved performance attained with the addition of a cosolvent to the extractant fluid through the use of the process and apparatus of this invention.

Referring to FIG. 2, a feed mixture, for example ethanol/water, is pressurized and pumped by pump 10 through suitable pressure line 11 into extractor 12 designed to provide for the countercurrent contacting of the aqueous feed mixture and the fluid extractant. Extractor 12 may be any suitable pressure vessel designed to provide efficient liquid-liquid contact, such as by countercurrent flow in a packed or sieve-plate tower. Liquid carbon dioxide from pressure line 13 is introduced into the bottom of extractor 12. The cosolvent is provided from cosolvent feed tank 15 and pumped by pump 16 through line 17 into mixer 18 where the cosolvent is mixed with carbon dioxide fed from line 13 through branch line 19 into mixer 18. Mixer 18 is typically an in-line or static fluid mixer. The cosolvent/carbon dioxide extractant fluid mixture is fed through line 20 into extractor 12 at a level which insures that essentially all of the ethanol in the feed mixture introduced into extractor 12 has been extracted from the water by the extractant. That portion of additional liquid carbon dioxide which is introduced through line 13 into the bottom of extractor 12 serves to extract cosolvent from what may be termed a preliminary raffinate i e the mixture formed in extractor 12 of water and any residual cosolvent. After such extraction, the preliminary raffinate is then discharged from extractor 12 as essentially cosolvent-free final raffinate. In a preferred embodiment of the practice of this invention, the fluid in extractor is maintained at essentially room temperature at a pressure between about 60 and about 85 atmospheres.

The final liquid raffinate, comprised of water, some residual carbon dioxide and a very small residual amount of ethanol and cosolvent, is withdrawn from extractor 12 through line 24 and a pressure-reducing valve 25 into separator 26. The resulting decompressed raffinate is a two-phase mixture of liquid water, with a small amount of dissolved carbon dioxide as well as the residual ethanol, and carbon dioxide vapor. The water phase is withdrawn through line 27 and pressure-reducing valve 28 to become the raffinate discharge. The carbon dioxide forming the vapor phase is transferred as raffinate vapor flash, at a pressure intermediate that in extractor 12 and atmospheric pressure, from separator 26 by line 29 to a vapor holding tank 30 for subsequent reconversion to liquid carbon dioxide. The latter is then introduced into the main stream in line 13.

The liquid carbon dioxide/cosolvent extract containing the dissolved ethanol is withdrawn from extractor 12 under essentially the same conditions as obtained in extractor 12 and transferred by pressure line 35 to the carbon dioxide recovery still 38. In a preferred embodiment of this invention, particularly in cases where extractor 12 is operated at the lower temperatures, e.g. ambient or lower, some reduction of extract pressure is carried out before the extract is introduced into still 38. This is accomplished in pressure reducing valve 36 associated with high-pressure line 35. In line 35, downstream from pressure reducing valve 36 is a decanter 37 in which small amounts of water in the extract (separated and coalesced in its pressure reduction) is removed and periodically drained off through line 41 controlled by valve 42.

The reduction of pressure, e.g. down to about 50 atmospheres, experienced by the carbon dioxide/cosolvent extract produces a still feed, which is part liquid, part vapor, at a lower temperature, e g. from about 15° to about 20° C. Distillation column 39 of still 38 is provided with sufficient stages to ensure that essentially all of the ethanol along with the cosolvent collects in the reboiler 40, along with some liquid carbon dioxide, to form the still bottoms.

It will be appreciated that these operational conditions are illustrative and not limiting. For example, the carbon dioxide/cosolvent extract pressure may range from about 15 to about 70 atmospheres prior to its introduction into distillation column 39; and the resulting still feed many range between about 10° and about 25° C.

In keeping with a preferred aspect of this invention, the heat supplied to reboiler 40 is provided through out-of-contact or indirect heat exchange with recompressed carbon dioxide vapor drawn from the overhead of distillation column 39 and sent through line 45, compressor 46, and line 47 into heat exchanger coils 48 in reboiler 40. In an alternative embodiment, reducing valve 36 may be replaced by a turbine 50 (shown in dotted lines), the power output of which may be used to furnish at least a portion of the power required to drive compressor 46 to which turbine 50 is mechanically linked by means not shown.

In the apparatus and system illustrated, the recompression of the carbon dioxide vapor from distillation column 39 in compressor 46 makes possible the utilization of the overhead vapor enthalpy as the reboiler heat source In order to accomplish this, the temperature at which the heat is delivered from the vapor must be raised to provide a driving force for heat transfer to the still bottoms in reboiler 40. This is achieved by vapor compression, so that condensation and enthalpy release will occur at a temperature higher than the boiling point of the reboiler liquid.

Figure 3:
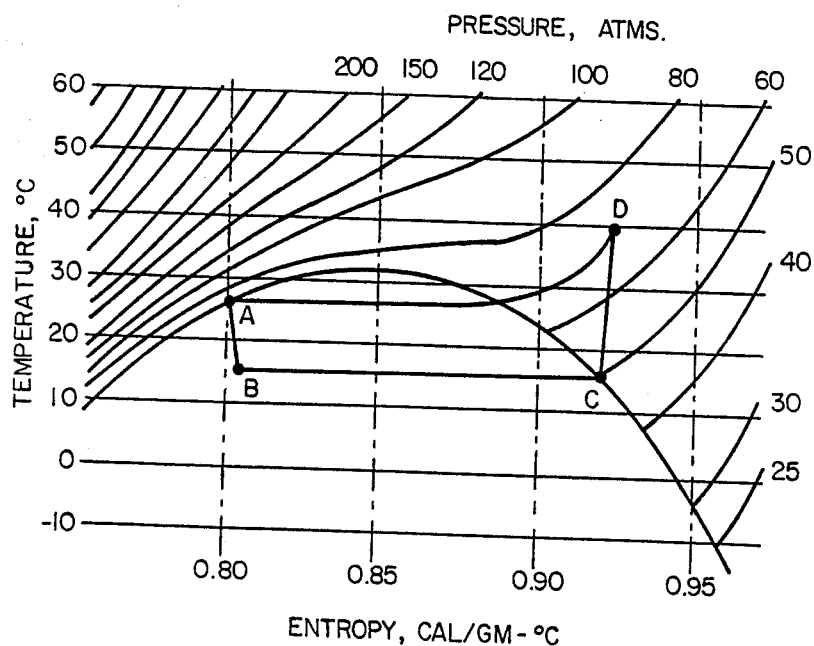
FIG. 3 is a plot of an exemplary recompression cycle for carbon dioxide on a fragment of a temperature-entropy diagram for carbon dioxide.

A typical vapor-recompression cycle is shown on the carbon dioxide temperature-entropy diagram of FIG. 3. In this example, the carbon dioxide leaving the extraction column in admixture with the cosolvent is at point A, here taken to be 25° C. and 65 atmospheres which means that the extractant is being used in its near-critical liquid state. Upon expansion into the distillation column, the stream (constituting the still feed) drops in pressure at constant enthalpy to 50 atmospheres. This is point B which in this example represents about 22% vapor and 78% liquid at 15° C. In the reboiler, energy is added and liquid is vaporized to point C, representing all vapor at the same pressure and temperature. Finally, this vapor, passing overhead from the distillation column, is then compressed to point D and, in giving up enthalpy in the reboiler, the stream returns from point D to point A.

In vapor-recompression evaporation or distillation, the elevation in boiling point of the more-volatile component (here carbon dioxide) caused by the presence of the less-volatile component (here the cosolvent and the liquid organic solute) is important. The still overhead leaving the distillation column 39 through line 45 will be at or near the boiling point of the more-volatile component; and the liquid (a solution of the ethanol solute and cosolvent with a minor amount of liquid carbon dioxide) in reboiler 40 will be at a higher temperature, the magnitude of the difference in temperature depending upon the boiling point elevation due to the presence of the solute and cosolvent.

The still overhead from distillation column 39 is compressed adiabatically in compressor 46 to add the enthalpy which must be transferred to the reboiler liquid to partially vaporize it while cooling and condensing the compressed vapor as it passes through heat exchanger 48. Thus the mechanism of vapor-recompression distillation requires that the still overhead must be pressurized by compression to a dewpoint temperature high enough above the reboiler liquid temperature to provide an economical temperature-difference driving force to effect the necessary heat transfer within reboiler 40. Therefore it follows that the greater the boiling-point elevation due to the presence of the solute and cosolvent, the greater is the compression required and the greater is the excess enthalpy that must be added by the compressor to provide an economical temperature-difference driving force for heat transfer. The magnitude of this excess may in some cases cause vapor recompression distillation to be uneconomical. However, it has been found that there exists an unexpectedly favorable low value for the boiling-point elevation in such carbon dioxide/cosolvent/organic liquid/aqueous solutions as employed in the process of this invention. It will, of course, be appreciated that such a low boiling-point elevation requires only a moderate increase in still overhead pressure. This means that a comparatively small amount of energy is required to compress the still overhead and hence to separate the solute from the liquid carbon dioxide extract. This, in turn, in part, gives rise to the low-energy characteristics associated with the preferred process of this invention.

Following the example used to described the embodiment of FIG. 2, the still overhead vapor sent to compressor 46 is under essentially the same conditions, 50 atmospheres and 15° C. which typically prevails in distillation column 39; while the compressed and heated vapor introduced into heat exchanger 48 is at 60 to 85 atmospheres (essentially the extraction pressure) and about 35° to 45° C. As will be described below, a portion of the compressed and heated vapor from compressor 46 may be used to heat the expanded still bottoms from reboiler 40.

Transfer of heat to the liquid in reboiler 40, through heat exchange with the compressed and heated vapors, results in the boiling off of additional carbon dioxide. Because of this very low heat of vaporization, the heat supplied from the recompressed vapor is sufficient to boil off the carbon dioxide, a fact which results in the material reduction in energy requirements compared, for example, with the heat required in the distillation of a liquid organic/water mixture.

The warmed still bottoms made up of product ethanol, cosolvent and a small amount of carbon dioxide are discharged from reboiler 40 through pressure line 52 and pressure-reducing valve 53 from which they emerge at a much reduced pressure, e.g. 3 atmospheres, intermediate between the still pressure and atmospheric and at a low temperature, e.g. −10° C. The decompressed cooled still bottoms are then brought back up to a temperature, e.g. to about 10° C., intermediate that temperature at which they were discharged from valve 53 into line 54 and ambient temperature. This heating is accomplished within heat exchanger 55 using a compressed vapor slip stream drawn off line 47 through line 56 as a heat source. If it is desirable to have the two streams of carbon dioxide condensate leaving heat exchanger 48 through line 60 and leaving heat exchanger 55 through line 61 at or near the extraction temperature, e.g. substantially room temperature, one may include some refrigeration means such as heat exchanger 59 in line 60 in accordance with well established engineering practice.

The product ethanol and cosolvent along with any carbon dioxide vapor at the reduced pressure, e.g. about 3 atmospheres, are carried by line 62 from exchanger 55 into flash vessel 63. The latter serves as a separator from which the carbon dioxide vapor is taken off through line 64 into vapor holding tank 30. The liquid mixture bottoms of product and cosolvent in flash tank 63 must be separated and FIG. 2 illustrates the use of still 65 to accomplish this. The liquid bottoms are first heated to their boiling point in heat exchanger 66 through indirect heat exchange with a heat transfer fluid, e.g. oil taken from a supply tank 67 delivered by a suitable pump 68 through heater 69 by suitable conduit 70 to heat exchanger 66. The heat transfer fluid discharged from heat exchanger 66 is then returned to supply tank 67 through line 71. It will be appreciated that the means shown for heating the liquid bottoms discharged from separator 62 are in actuality represented by simplified illustrations and that many suitable arrangements of heating means for raising the temperature of the bottoms to that required for introduction into still 65 through line 72 are within the skill of the art.

The top section of still 65 is equipped in a well known manner with partial reflux condenser coils (not detailed in the drawing); the center section has a feed dispenser and packing of well-known design to provide contact area between the ethanol vapor upflow and the cosolvent liquid downflow in the distillation column (not detailed in the drawing); and the bottom reboiler section 73 houses reboiler coils 74. Heat is supplied to the reboiler liquid by circulating a heat transfer fluid by pump 67 from fluid supply tank 67 through line 76 and heater 77 through coils 74 and returning it by line 78 to supply tank 67.

The bottoms in still reboiler section 73 are the higher-boiling cosolvent and they are drawn off at a rate to maintain a liquid-vapor interface just above the still coils. This cosolvent is taken by line 79 through condenser 80 into cosolvent storage tank 81 from where it is recycled through line 82 to cosolvent feed tank 15. The latter may, if desired, be combined with tank 81 into a single cosolvent holding tank. If necessary, makeup cosolvent may be introduced from makeup supply tank 83 into line 82.

The lower-boiling point organic liquid product vapor is withdrawn from the top of still 65 through line 85 by way of condenser 86 into product solute tank 87.

The combined carbon dioxide vapor in holding tank 30 must be converted to a solvent condition—preferably near or above its critical pressure of 72.8 atmospheres so that it may be used at temperatures below its critical temperature of 31.1° C. The vapor is therefore taken through line 90 to compressor 91 which is preferably a two-stage compressor with intercooling. Compressor 91 may be mechanically connected to turbine 50 (by means not shown) and driven by it. The heat of compression is subsequently removed from the compressed carbon dioxide in one or more aftercoolers 92 and 93 prior to being carried by line 94 into liquid carbon dioxide return line 60 which becomes carbon dioxide feed line 13. Any necessary pressurized makeup solvent-condition carbon dioxide is brought into feed line 13 from makeup supply 95; and any required adjustment in carbon dioxide feed temperature is accomplished in heat exchanger 96.

In the conventional distillation of azeotrope-forming mixtures, the resulting product solute may require additional azeotropic distillation in those cases in which the product is leaner in solute than the azeotropic composition. In the process of this invention, however, the fluid solvent and process conditions may be chosen to provide a product solute which is richer in solute than the corresponding azeotrope composition, thereby making it possible to eliminate the more difficult and energy-consuming azeotropic distillation step and to substitute conventional distillation for it. Therefore, in some cases where sufficient solvent remains in the organic liquid solute product, it may be desirable to subject the product liquid withdrawn through line 85 to a final distillation step in conventional distillation apparatus (not shown). Such an optional final distillation step will, of course, require far less energy than would be required to effect the separation of the liquid organic solute and solvent solely by conventional distillation followed by any necessary azeotropic distillation.

The individual apparatus components are either presently available or can be readily designed and constructed using available information concerning materials and performance of related available components. In the case of some of the components it may be found desirable to use specific embodiments or modifications of known equipment to achieve an optimum design balance in the overall system. Thus, for example, it may be desirable to use a pulsed extraction column to ensure that the small droplets making up the discontinuous phase are efficiently suspended throughout the continuous liquid during contacting and extracting.

The addition of a cosolvent to liquid carbon dioxide extractant is illustrated in FIGS. 4 and 5. The cosolvent used was 2-ethyl hexanol. The fluids in the extractor 12 (FIG. 2) during extraction were maintained between about 15° and 25° C. and between about 80 and 82 atmospheres. In carbon dioxide recovery still 40 the temperature was maintained between about 10° and 25° C., and pressure between about 35 and 50 atmospheres. The cosolvent/product separation still 65 was kept at between about 1.5 atmospheres and at a temperature between about 80° and 170° C.

A number of runs were made in a pilot plant constructed as a manifestation based upon FIG. 2, and having sampling and analyzing means incorporated in appropriate locations within the plant. Aqueous solutions having ethanol concentrations varying from as little as 0.05 weight percent of ethanol to 10+ percent were used as feeds. Solvent-to-feed ratios were varied from 1 to 10, and feed rates of the aqueous solution were between ½ and 5 pounds per minute. The amount of cosolvent used was varied from zero up to about 30 weight percent based on carbon dioxide weight.

The change in the extractor performance due to the addition of the cosolvent was monitored by measuring the change in ethanol concentrations in the raffinate. The results are plotted in FIG. 4 which shows that the degree of extraction is directly proportional to the cosolvent concentration in the liquid carbon dioxide extractant for a given solvent-to-feed ratio. This linear relationship extends into dilute systems which means that suitable cosolvents will work equally well throughout a commercial extraction column.

A quantitative measure of the extractor performance is the stage efficiency. This is calculated from an estimate of the number of theoretical stages required for a given separation and the actual number of stages. The theoretical number of stages is computed using a McCabe-Thiele diagram Equilibrium data are needed for alcohol/water/carbon dioxide/cosolvent systems, and therefore a numerical approximation of the McCabe-Thiele method was chosen.

The known Kremser-Brown-Souders equation was used to calculate the number of theoretical stages for the extraction process before the cosolvent addition. An assumption was made that adding cosolvent to the extractor would not change the number of theoretical stages as long as all other operating conditions remain unchanged. This assumption allowed a new distribution coefficient (D.C.) of ethanol in the presence of cosolvent to be calculated. The change in the D.C. was found to increase by as much as a factor of 20 as shown in FIG. 5. This change signifies that cosolvents significantly enhance the solvent's stripping action and thus the extraction process.

Using the apparatus and process of the present invention, it has been found that for the extraction of ethanol in a $CO_2$/cosolvent/water/ethanol system, a desirable cosolvent to be added is 2-ethyl hexanol (typically 2.9% of total volume for a concentration of about 9% ethanol in the feed). This latter cosolvent in the proportion indicated provides a DC of from 0.2 to 0.4. This result can be compared with the DCs achieved in comparison with other cosolvents or no cosolvent at all, as shown in the following table where Wt % is the weight percent of ethanol in the feed and DC, of course, is the distribution coefficient

TABLE I

|  | Wt. % | DC |
|---|---|---|
| No cosolvent | 10 | 0.03–0.06 |
| hexanol | 10 | 0.1 |
| 2-ethyl hexanediol | 13 | 0.01–0.07 |
| n-Amyl alcohol | 11 | 0.12 |
| tert. amyl alcohol | 9 | 0.1 |
| n-butanol | 9 | 0.07 |

Similarly for the extraction of acetic acid from a $CO_2$/cosolvent/water/acid system, hexanoic acid is a preferred cosolvent because it exhibits a DC of 0.387 for a feed concentration of 10% acetic acid, as compared to other or no solvents as shown in the following table.

TABLE II

|  | Wt. % | DC |
|---|---|---|
| No cosolvent | 10.7 | 0.164 |
| n-amyl alcohol | 9.4 | 0.281 |
| 2-ethyl hexanol | 8.7 | 0.265 |

The addition of cosolvents in extracting an organic liquid from an aqueous solution using as a fluid extractant a pressurized gas can decrease the overall capital and operating costs of an extraction system, decrease the solvent-to-feed ratio required to perform a given amount of solute stripping, and permits decreasing the extractor diameter, reboiler surface area, compressor capacity and power consumption.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawings shall be interpreted as illustrative and not in a limiting sense.

We claim:

1. A quaternary fluid extraction system comprising:
water as a first component of said system;
an organic solute as a second component of said system;
a fluid extractant formed of the third and fourth components of said system, said fluid extractant comprising a mixture of liquid carbon dioxide as said third component and a monofunctional hydrocarbon cosolvent said fourth component, which cosolvent is a liquid at about 60° C. and standard pressure; is a substantially better solvent for the liquid solute than for the water; has a solubility in liquid carbon dioxide greater than 1 weight percent than under the conditions of extraction and separation, the carbon dioxide/cosolvent mixture forms a single phase; in the absence of solute, has a distribution coefficient (carbon dioxide/water) of greater than 3 on a weight basis; has a boiling point substantially above or below that of the liquid solute at atmospheric pressure; and is substantially chemically unreactive under process conditions with the first solvent fluid, the liquid solute and water.

2. A quaternary system in accordance with claim 1 wherein said cosolvent is selected from the group consisting of 2-ethyl hexanol, n-butanol, n-amyl alcohol, t-amyl alcohol, dodecyl alcohol, decyl alcohol, hexanoic acid, octanoic acid, decanoic acid, pentanoic acid, heptanoic acid, furfural, trioctylamine, isopropylamine, trioctylphosphine oxide, and mixtures thereof.

3. A quaternary system in accordance with claim 1 wherein said organic liquid solute is ethanol and said cosolvent is 2-ethyl hexanol.

4. A quaternary system in accordance with claim 1 wherein the temperature of said liquid carbon dioxide is below its critical temperature and is at a pressure sufficient to maintain it in the liquid state.

5. A quaternary system in accordance with claim 4 wherein the temperature of said liquid carbon dioxide ranges between about 15° and about 30° C., and the pressure ranges between about 40 and about 85 atmospheres.

* * * * *

UNITED STATES PATENT AND TRADEMARK OFFICE
CERTIFICATE OF CORRECTION

PATENT NO. : 4,877,530

DATED : October 31, 1989

INVENTOR(S) : John M. Moses

It is certified that error appears in the above-identified patent and that said Letters Patent is hereby corrected as shown below:

```
    Claim 1, column 14, line 57, after "cosolvent", insert
-- as --.
```

Signed and Sealed this

Thirteenth Day of November, 1990

Attest:

HARRY F. MANBECK, JR.

*Attesting Officer*  *Commissioner of Patents and Trademarks*